United States Patent
Anastassacos et al.

(10) Patent No.: US 10,748,007 B2
(45) Date of Patent: *Aug. 18, 2020

(54) IDENTIFYING OBJECTS IN AN IMAGE

(71) Applicant: Wayfair LLC, Boston, MA (US)

(72) Inventors: Nicolas E. Anastassacos, Heidelberg (DE); Chris R. Bean, Chandler's Ford (GB); Naresh Krishna Gopikrishnan, Southhampton (GB); Alexander Horsfield, Durham (GB); Joe Pavitt, Chandler's Ford (GB); Nicholas Wilkin, Newcastle upon Tyne (GB)

(73) Assignee: Wayfair LLC, Boston, MA (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/943,818

(22) Filed: Apr. 3, 2018

(65) Prior Publication Data

US 2018/0225514 A1    Aug. 9, 2018

Related U.S. Application Data

(63) Continuation of application No. 15/077,942, filed on Mar. 23, 2016, now Pat. No. 10,013,613.

(51) Int. Cl.
*G06K 9/00* (2006.01)
(52) U.S. Cl.
CPC ......... *G06K 9/00691* (2013.01); *G06T 2207/30242* (2013.01)
(58) Field of Classification Search
None
See application file for complete search history.

(56) References Cited

U.S. PATENT DOCUMENTS

| | | | |
|---|---|---|---|
| 9,129,277 B2 | 9/2015 | MacIntosh | |
| 9,148,562 B2 | 9/2015 | Boncyk et al. | |
| 9,171,195 B1* | 10/2015 | Rybakov | G06K 9/6807 |
| 9,711,182 B2 | 7/2017 | Dharssi et al. | |
| 2005/0149230 A1 | 7/2005 | Gupta et al. | |
| 2012/0113092 A1 | 5/2012 | Bar-Zeev et al. | |
| 2014/0002442 A1 | 1/2014 | Lamb et al. | |
| 2014/0172891 A1 | 6/2014 | Amidei et al. | |
| 2014/0267404 A1 | 9/2014 | Mitchell et al. | |
| 2015/0097862 A1 | 4/2015 | Reisner-Kollmann et al. | |

(Continued)

OTHER PUBLICATIONS

Espinace et al., "Indoor scene recognition by a mobile robot through adaptive object detection", 2013 (Year: 2013).*

(Continued)

*Primary Examiner* — Soo Jin Park
(74) *Attorney, Agent, or Firm* — Wolf, Greenfield & Sacks, P.C.

(57) ABSTRACT

Identifying objects in an image. An image is received. One or more objects in the image are identified, based on a database of identified objects, and wherein one or more other objects in the image are unidentified based on the database of identified objects. One or more salient objects in the image is identified, based on execution of a saliency algorithm. A generic location for the image is determined, based on the one or more identified salient objects and a database that associates objects with generic locations. One or more of the unidentified objects are identified, based on the determined generic location for the image.

15 Claims, 9 Drawing Sheets

```
IMAGE 1

OFFICE
                    INITIAL   EXTRA   TOTAL
1. LAMP             .80               .80
2. DESK             .80               .80
3. COMPUTER         .60       .90     1.50
4. PHONE            .10       .80     .90
5. FILING CABINET   .40       .40     .80
```

(56) References Cited

U.S. PATENT DOCUMENTS

2016/0292507 A1 10/2016 Ghoson et al.
2017/0278245 A1 9/2017 Anastassacos et al.

OTHER PUBLICATIONS

Lim et al., "Ontology-based unified robot knowledge for service robots in indoor environments", 2011 (Year: 2011).*

IBM, List of IBM Patents or Patent Applications Treated as Related, Appendix P, dated Apr. 18, 2018, 2 pages.

IBM et al., "Writer-Independent Automatic Handwriting Recognition Using a Continuous Parameter Mixture Density Hidden Markov Model," An IP.com Prior Art Database Technical Disclosure, IP.com No. IPCOMM000104571D, Original Disclosure Information: TDB v36 n5 05-93, Original Publication Date: May 1, 1993, IP.com Electronic Publication Date: Mar. 19, 2005, pp. 93-94.

Disclosed Anonymously, "Facies classification based on Hidden Markov model," An IP.com Prior Art Database Technical Disclosure, IP.com No. IPCOM000225073D, IP.com Electronic Publication Date: Jan. 23, 2013, pp. 1-5.

Hornegger et al., "Object recognition using hidden Markov models," appeared in Proceedings: Pattern Recognition in Practice IV, Lehrstuhl für Mustererkennung (Informatik 5), Friedrich-Alexander Universität Erlangen-Nürnberg, Martensstr. 3, D-91058, Erlangen, Germany, Vlieland, Netherlands, 1994, pp. 1-8.

QUALCOMM, "Enhancing augmented reality with advanced object detection techniques," 3D Object Detection, https://www.qualcomm.com/invention/research/projects/computer-vision/3d-object-detection, Printed on Feb. 10, 2015, Pages 1-4.

Esposito, "AI*AI 2001: Advances in Artificial Intelligence," Proceedings of the 7th Congress of the Italian Association for Artificial Intelligence Bari, Italy, Sep. 25-28, 2001, Dated: Jul. 2001, © Springer, Jun. 30, 2003, pp. 1-396.

Galindo et al., "Multi-Hierachical Semantic Maps for Mobile Robotics", IEEE 2005, pp. 1-7.

Herrero et al., "An Inferring Semantic System Based on Relational Models for Mobile Robotics", 2015 IEEE International Conference on Autonomous Robot Systems and Competitions, p. 1-6.

Young et al., "Towards Lifelong Object Learning by Integrating Situated Robot Perception and Semantic Web Mining", ECAI, 2016, pp. 1458-1463.

* cited by examiner

IDENTIFYING OBJECTS IN AN IMAGE

CROSS-REFERENCE TO RELATED APPLICATION

This application claims priority under 35 U.S.C. § 120 and is a continuation of U.S. patent application Ser. No. 15/077,942, filed Mar. 23, 2016, entitled "IDENTIFYING OBJECTS IN AN IMAGE".

BACKGROUND

The present invention relates generally to a identifying objects in an image, and more particularly, to identifying objects based on determining a generic location for the image.

Current object recognition systems are not able to easily distinguish between objects present in a photograph, as they use feature-model mapping. It is even more difficult to recognize objects in a video sequence or when they are displayed sub-optimally (e.g., rotated or blurred), or partially obstructed.

SUMMARY

Embodiments of the present invention disclose a computer-implemented method, computer program product, and system for identifying objects in an image. An image is received. One or more objects in the image are identified, based on a database of identified objects, and wherein one or more other objects in the image are unidentified based on the database of identified objects. One or more salient objects in the image are identified, based on execution of a saliency algorithm. A generic location for the image is determined, based on the one or more identified salient objects and a database that associates objects with generic locations. One or more of the unidentified objects are identified, based on the determined generic location for the image.

DETAILED DESCRIPTION

Embodiments of the present invention disclose a computer-implemented method, computer program product, and system for identifying objects in an image. An image may be received and a plurality of objects in the image may be detected. From the detected objects, one or more may be identified, while one or more may remain unidentified. From the identified objects, one or more salient objects may be determined. Based on the salient objects, a generic location for the image may be determined, from which at least one of the unidentified detected objects may be identified.

Figure 1:
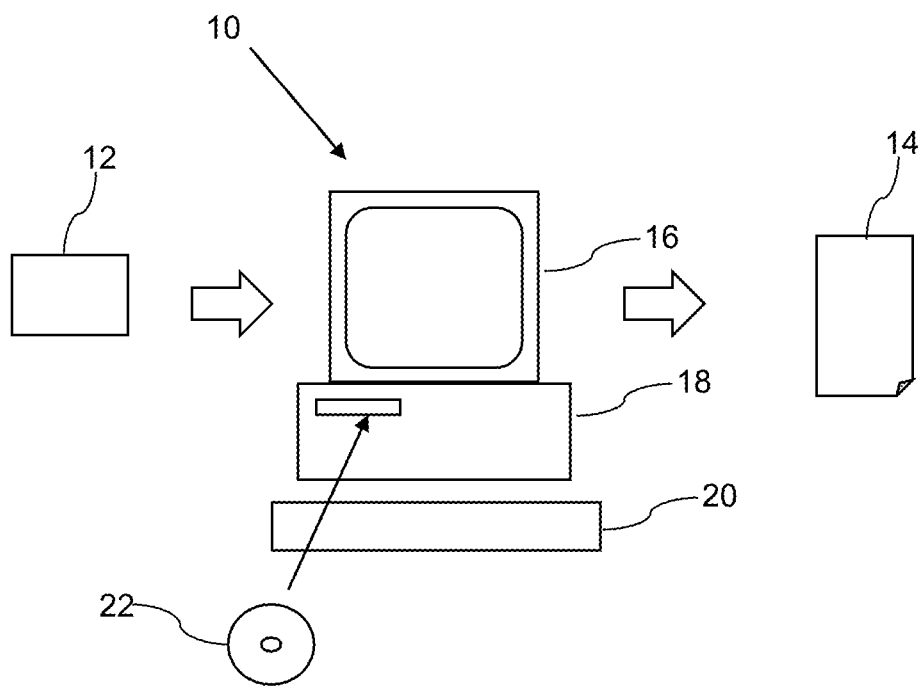
FIG. 1 is a schematic diagram of a computer system, in accordance with an embodiment of the present invention.

FIG. 1 shows a computer system 10 that may be used to process an image 12 to produce an output 14 that is a list of detected and identified, or recognized, objects in the image 12, in accordance with an embodiment of the present invention. The image 12 may be a two-dimensional or three-dimensional image that is stored in any suitable image format, such as a JPEG file. The image 12 may include pixel data that can be accessed by the computer system 10 for the purpose of processing the image 12 according to one or more algorithms to detect the presence of and identify objects in the image 12. Identification, or recognition, of an object generally refers to the process of determining what actual object the image object may depict and assigning a semantic label to the image object, generally with reference to an appropriate database of known objects, as described in further detail below. The output 14 may be expressed in different forms and may provide data that may be overlaid onto the image 12 to link the objects in the image 12 to the detail of the output 14. The output 14 may then be used in a variety of applications where object identification is important. For example, the output 14 may be used to issue an alert to a forensic application, or the output 14 may be analyzed to identify whether it indicates the presence of a particular object of interest.

The computer system 10 may include a display device 16, a processor 18, and user input devices 20. A computer program product is provided that may be stored on a computer readable medium 22, here a CD-ROM. The computer program product may include a set of program instructions that are used to control the processor 18. The processor 18 may execute the instructions of the computer program product in order to carry out the algorithms for processing the image 12. The computer system 10 shown here is a desktop computer that receives the image 12 locally, however the functionality provided by the computer system 10 can also be delivered by a remote server that includes a set of distributed components.

The image 12 may be processed to detect and identify objects in the image 12. An object is said to be detected in an image if a defined area in the image is considered to belong to the same object; an object is said to be identified if a semantic label from an appropriate database of known objects can be applied to the detected object with a sufficient degree of certainty that the detected object corresponds to an object referenced in the database. For example, an area of pixels in the image 12 may be considered to all form the same object, and this object may be identified as a "table" with a 90% certainty, or confidence, that the detected object is indeed a table. Thus, an object is only "identified" once a meaning can be attached to the object detected in the image.

Figure 2:
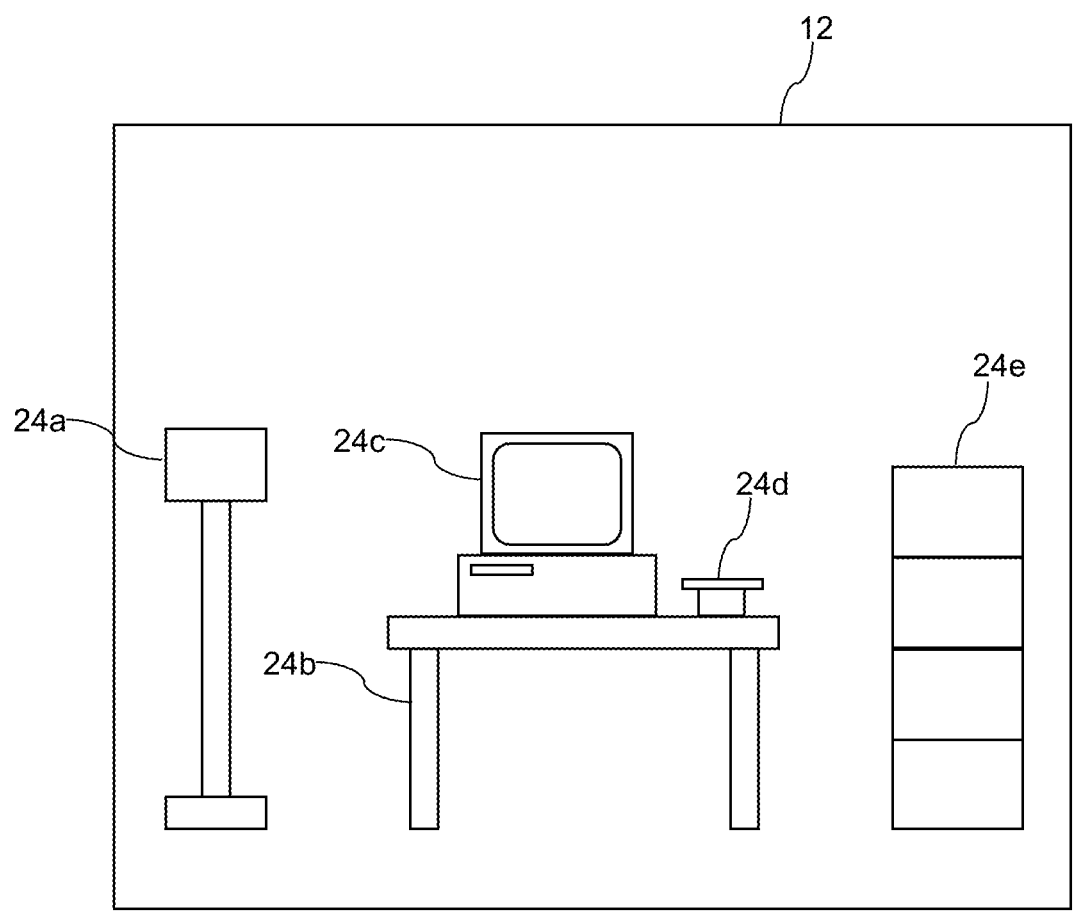
FIG. 2 is a schematic diagram of an image containing various objects, in accordance with an embodiment of the present invention.

FIG. 2 gives an example of an image 12, here shown in a highly stylized form in order to illustrate the principal of the processing carried out by the processor 18 on the image 12, in accordance with an embodiment of the present invention. Five separate objects are present and may be detected in the image 12 (detected objects 24a-24e). The detection of objects in an image may be carried out in a variety of different ways. One well-known method uses one or more segmentation algorithms to identify edges (using pixel colors and/or intensities, for example) in images, which can then be joined together to form an object. Different levels of granularity may be used, depending upon the colors and/or intensities in the image, in order to return a number of detected objects that is likely to be reasonable for most images.

A first pass of a segmentation algorithm over the image 12 may detect a small number of objects present in the image 12. The settings of the segmentation algorithm may be adjusted as the processing occurs, in order to limit the number of detected objects to, for example, less than ten, or to reject present objects below a certain size, in order to return a reasonable number of detected objects in the image 12. At this point, in one embodiment, the detected objects are not identified, and it is not known what the individual detected objects represent, only that certain objects present in the image have been detected. In one embodiment, the processor 18 may perform an identification of at least one of the detected objects in the image 12.

The identification of a detected object may be carried out in various ways. In an exemplary embodiment, the detected objects may be identified using a feature detection process. For example, an identification algorithm using feature detection on the detected objects 24a-24e in the image 12 of FIG. 2 may be able, with reference to an appropriate database of known objects, to identify the detected object 24a as a lamp and the detected object 24b as a desk, while it may fail to identify other detected objects in the image 12. Individual features of the detected objects 24a and 24b may be identified with enough certainty that the respective entire object can be identified. For example, features of detected object 24b include two vertical legs and a horizontal surface, above and connected to the legs, which may suffice to identify it as a desk.

Figure 3:
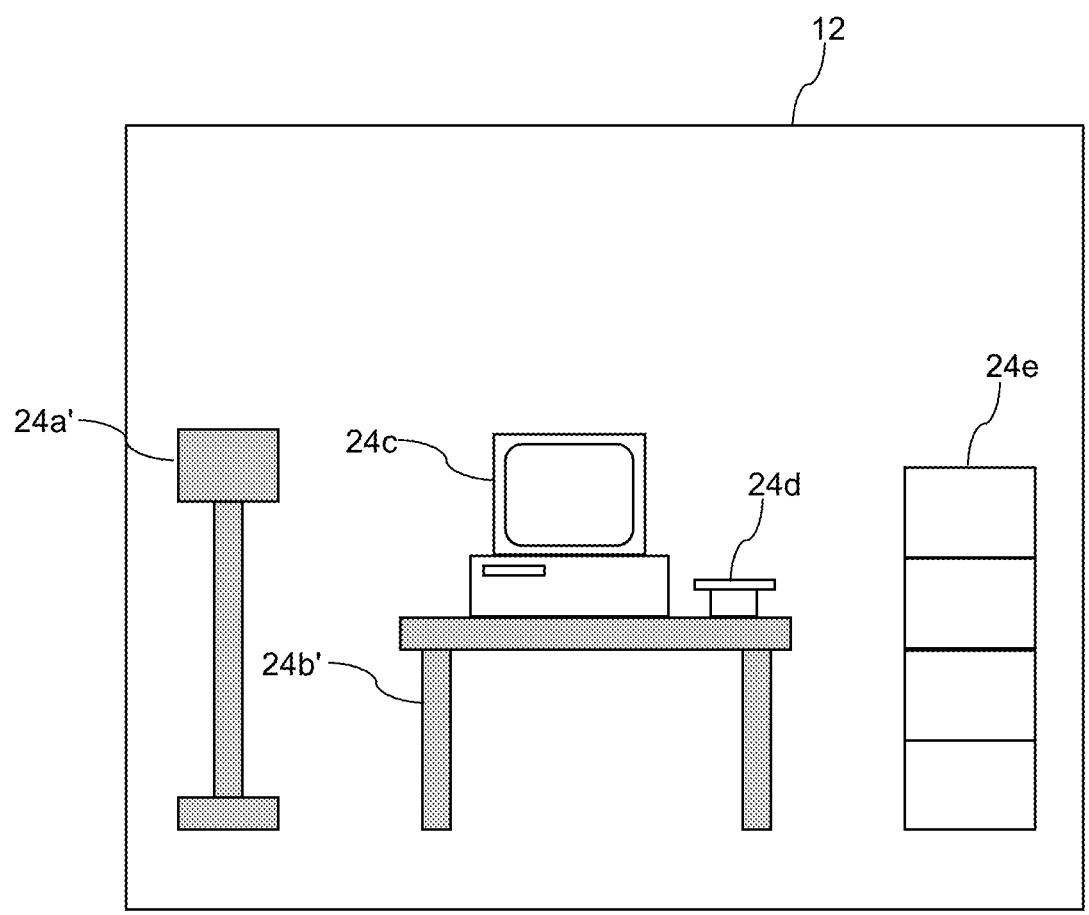
FIG. 3 is a schematic diagram of the image of FIG. 2 showing identified objects, in accordance with an embodiment of the present invention.

FIG. 3 shows the same image 12 as in FIG. 2, but now highlighting two detected objects that have been identified, lamp 24a' and desk 24b', in accordance with an embodiment of the present invention. Computer-implemented identification algorithms may be subject to uncertainty, so identifying a particular object from the detected objects may include identifying a number of features of the particular object, assigning a likelihood to a semantic label for the particular object, based on the identified features, and identifying the particular object as corresponding to the semantic label if the assigned likelihood is determined to be greater than a predetermined threshold. For example, the likelihood may be expressed as a probability from 0 to 1, with a predetermined threshold of 0.8 for accepting the output of the identification algorithm as correctly identifying the object. In this example, both the lamp 24a' and the desk 24b' have a probability of 0.8 and so pass the necessary test for identification. The computer (detected object 24c) has only been identified with a probability of 0.6, the phone (detected object 24d) with a probability of 0.1 and the filing cabinet (detected object 24e) with a probability of 0.4. All of these probabilities are below the threshold of 0.8 and so these detected objects cannot be identified with sufficient certainty.

Another stage of the processing of the image 12 by the processor 18 may be the execution of a saliency algorithm on the image, with respect to the identified objects. Salient objects in an image refer to those that are sufficiently distinct from the background of the image and from other image objects that they can be reliably perceived by humans, and may include, for example, relatively large objects and foreground objects. A variety of saliency algorithms are well known, including those based on image segmentation or saliency maps. The goal of the saliency algorithm is to distinguish one or more identified objects in the image, which may provide context for the image, in accordance with an embodiment of the invention. A simple saliency algorithm may be used, such as one that determines which of the identified objects are closest to the center of the image, or one that determines the largest identified objects in the image. Various, more complex saliency algorithms are also available for use.

In one embodiment, once the salient objects among the identified objects are determined, this information may be used to query a first database, which may include generic locations in which a salient object may appear, with a likelihood expressed, for example, as a probability between 0 and 1. Based on the probabilities, the processor 18 may generate a ranked list of generic locations for the salient objects in the image, for example, by summing the probabilities. For example, a saliency algorithm may determine that the lamp 24a' and the desk 24b' of FIG. 3 may be considered salient objects, and this may be used to query the first database of generic location information.

Figure 4:
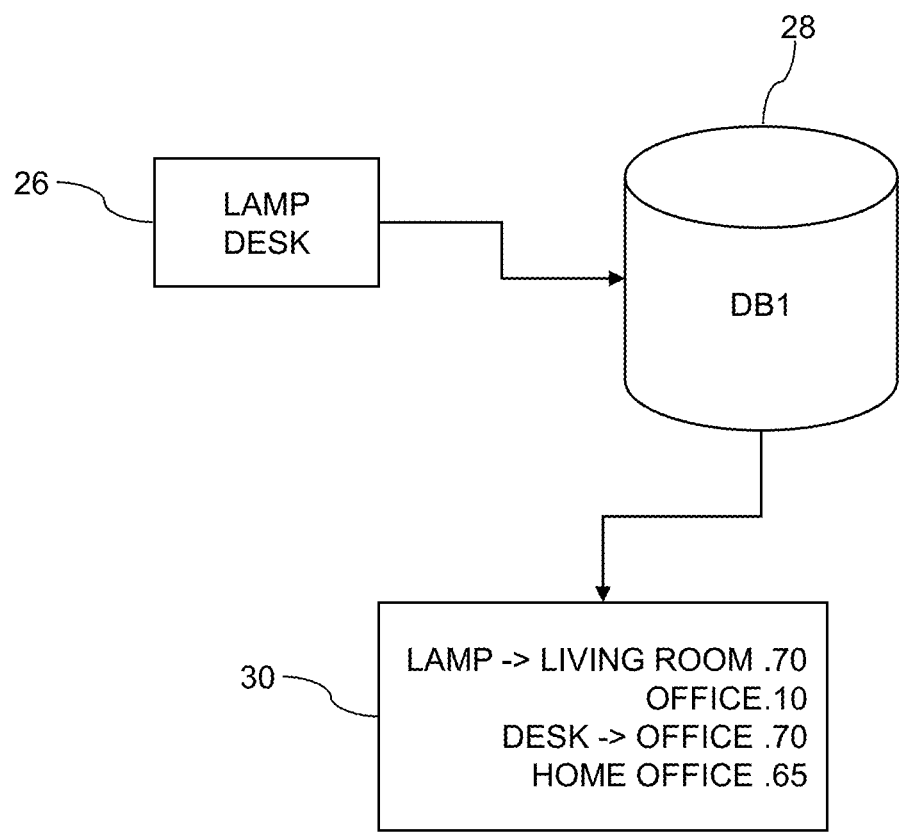
FIG. 4 is a schematic diagram of an output from a first database following a query to that database, in accordance with an embodiment of the present invention.

FIG. 4 illustrates a query 26 detailing semantic labels associated with salient objects (e.g., "lamp" and "desk" associated with lamp 24a' and desk 24b') being passed to a first database 28 and receiving an output 30, in accordance with an embodiment of the present invention. The output 30 may give, for example, respective probabilities for generic locations of the salient objects. In this example, the probabilities of two generic locations for the lamp are: living room 0.7 and office 0.1; the probabilities of two generic locations for the desk are: office 0.7 and home office 0.65. These probabilities may be added together, to provide the following aggregated probabilities of three generic locations for both the lamp and the desk: living room 0.7, office 0.8, and home office 0.65. The number one position in the list of aggregated probabilities in this example is "office," and this is, therefore, the candidate environment for image 12, which may be used as a basis for identifying further, unidentified, objects in the image 12.

A purpose of querying the first database 28 may be to determine the most likely generic location shown in an image being processed. The determined generic location may be one which best corresponds to the salient identified objects in the image, and this information may be fed back to assist in the identification of remaining, unidentified, objects in the image, which may not have been identified with sufficient certainty during a first pass (using, for example, a feature identification algorithm) over objects detected in the image. The salient objects may be assumed to be the most important objects in the scene captured by the image 12, and hence these salient objects may be used to determine a generic location for the image 12.

The first database 28 may include objects recognized and output by the object identification algorithm that processes image 12. Potential objects that may be output by the identification algorithm may be included in the first database 28. This first database 28 may, for example, be populated manually, with each stored object being assigned probability weightings corresponding to a set of human-defined generic locations. Alternatively, the first database 28 may be populated from a set of known stock images, where the generic location of these stock images are known and the objects in the stock images are known, so that the percentages in the first database 28 may represent actual probabilities of occurrences of objects in images. Various online databases that provide context for objects in images may also be adapted for this purpose.

Figure 5:
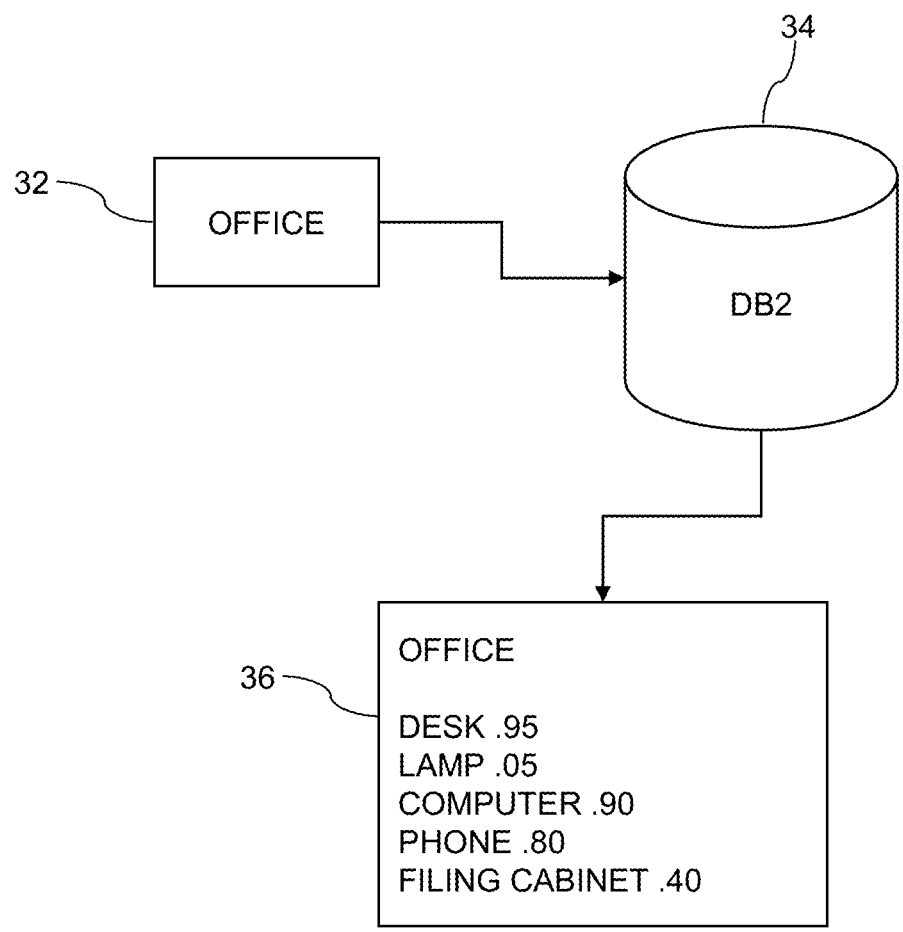
FIG. 5 is a schematic diagram of an output from a second database following a query to that database, in accordance with an embodiment of the present invention.

In an embodiment of the invention, once a generic location is determined from a query to the first database 28, the processor 18 may send a query 32 to a second database 34 and receive an output 36 from the second database 34, as illustrated in FIG. 5. The query 32 may include the generic location that has been determined following the query to the first database 28, and the output 36 returned from the second database 28 may include a list of objects that appear in the determined generic location, for example, with a probability from 0 to 1. The output 36 may then be used to identify further, unidentified objects in the image 12.

In FIG. 5, the output 36 may include five objects with probabilities as follows: desk 0.95, lamp 0.05, computer 0.9, phone 0.8, and filing cabinet 0.4. This choice of objects and probabilities are listed in order to illustrate processing carried out by the processor 18 and may not necessarily be a full list of such objects nor an accurate representation of the probabilities for the specific generic location "office". These probabilities may then be used to modify the original results from the first pass of the algorithm over the objects detected in the image 12, where objects may have been identified, but without a sufficient likelihood that the output may be relied upon.

For example, suppose the detected object 24c of FIG. 2 has been identified as a computer with only a likelihood of 0.6, the detected object 24d as a phone with only a likelihood of 0.1, and the detected object 24e as a filing cabinet with only a likelihood of 0.4, all below a threshold of 0.8 required to be sufficiently certain of the identification. These likelihoods (which may be considered as confidence levels in the output of the identification algorithm that is used) may then be increased by the output 36 from the second database 34, since the generic location of the scene shown in the image 12 may now be known from previous steps. A statistical normalization may then be applied to these values, and further detected objects may now be identified on the basis of the determined generic location for the image 12. Although, in general, use of the second database 34 will be to increase the likelihood of an object being identified, the database 34 may be so defined as to include data that may be used to decrease the confidence of an object identification. For example, if the above process identified an "ironing board" with a 0.9 confidence, and, based upon the other objects, it is determined that the image 12 is likely to be an office scene, then the likelihood that an actual ironing board would be in the office is very low, indicating that maybe the process has misidentified, for example, a desk or table. The knowledge that the algorithm has determined that the image 12 most likely depicts an office may diminish the confidence that there may be an ironing board in the scene.

Figure 6:
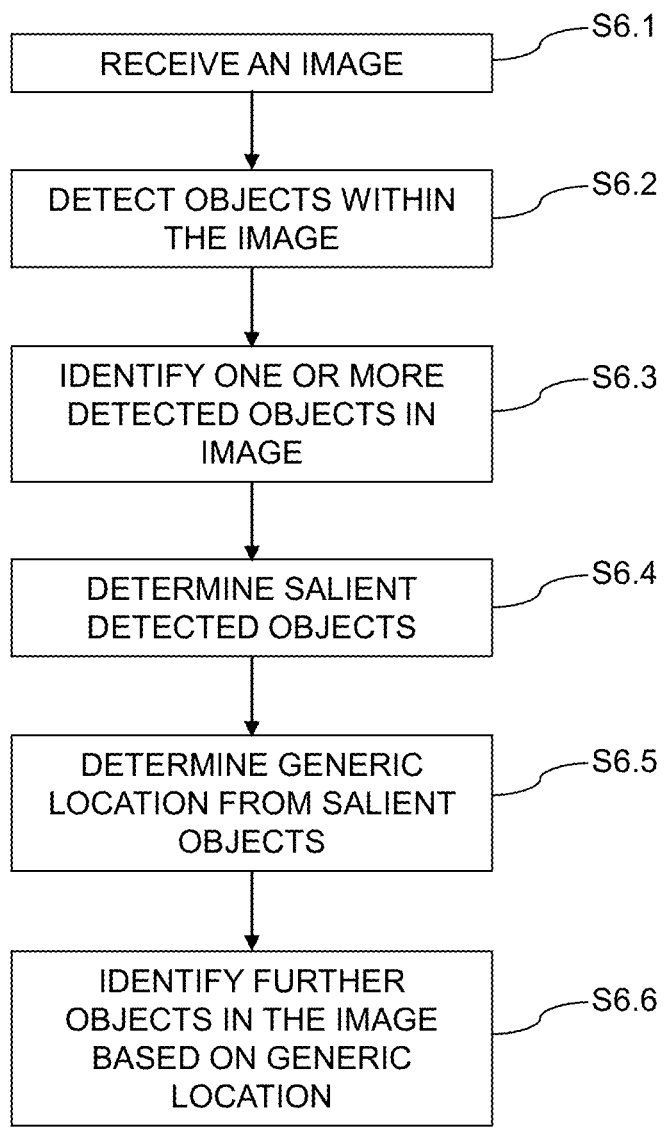
FIG. 6 is a flowchart depicting various steps of a method for processing an image to identify objects in the image, in accordance with an embodiment of the present invention.

FIG. 6 shows a flowchart that depicts various steps in the processing that has been discussed above with respect to the image 12, the processing being carried out by the processor 18 of the computer system 10, in accordance with an embodiment of the present invention. The method defined by the flowchart includes step S6.1, receiving an image. The image may be received from a remote location, so a user could take a photograph in their home, for example, and transmit the photograph to a web service that carries out the identification of the objects in the image of the photograph. The process may work independently of the file format of the image and whether the image is a two-dimensional or three-dimensional image.

In step S6.2 a plurality of objects in the image may be detected. As discussed above, this step may detect objects in the image, for example, by using a segmentation algorithm, although the detected objects may not yet be identified. In step S6.3 one or more of the detected objects may be identified. At least one detected object should be identified with a sufficient level of confidence that the identification may be accepted. For example, object features may be used in an algorithm that identifies one or more detected objects, so that a semantic label may be attached to the detected object.

In step S6.4 one or more salient objects from the identified objects may be determined. A saliency algorithm may operate to determine the salient, or important, objects in the image. This may be followed by step S6.5, which comprises determining a generic location for the image from the determined salient objects, and the final step may be step S6.4, which comprises identifying further objects from the detected objects on the basis of the determined generic location for the image. The process may involve querying two databases 28 and 34 that may allow the determination of the generic location from the identified objects and this may then be fed back to increase the confidence in the identification of the detected objects in the image.

Figure 7:
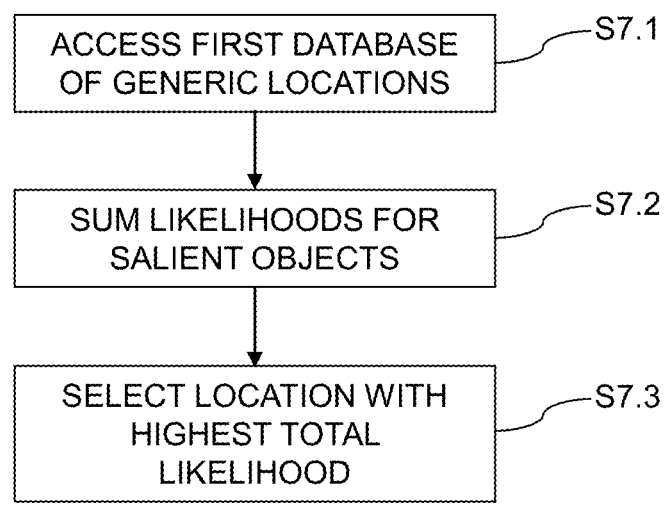
FIG. 7 is a flowchart depicting various steps of a method for determining a generic location of an image, in accordance with an embodiment of the present invention.

FIG. 7 shows a flowchart that details the methodology behind the determination of a generic location for an image from determined salient objects in the image, in accordance with an embodiment of the present invention. The flowchart of FIG. 7 is an exemplary method of carrying out the step S6.5 of FIG. 6. The first step of this method is step S7.1, which comprises accessing the first database 28 defining a generic location likelihood for a list of specific objects, another step is step S7.2, which comprises summing the generic location likelihoods for the determined salient objects, and another step of the method is step S7.3, which comprises selecting a generic location with a highest total likelihood from the summed generic location likelihoods for the determined salient objects.

As described above with reference to FIG. 4, the first database 28 may include a list of objects, all of which may outputs of the algorithm that is employed to identify objects (step S6.3 of FIG. 6) from the detected objects (step S6.2 of FIG. 6). These objects may be listed in the database 28 along with likelihoods for one or more generic locations for the objects. The database 28 may either be populated manually or be created from an analysis of a set of stock images. Each generic location likelihood that is stored in the database 28 may correspond to a probability from 0 to 1 that an image containing a specific object is from such a generic location.

The locations defined in the first database 28 are generic in the sense that they do not relate to specific physical locations but refer to general locations such as a living room, an office, a meeting room, and so on. A purpose of determining a generic location for the image from the salient objects as defined in step S6.5 of FIG. 6 and as preferably carried out as per the flowchart of FIG. 7 may be to enable the identification of those detected objects in the image that were not identified to a sufficient level of certainty during a first pass of an identification algorithm. In order to facilitate identification of unidentified detected objects, any detected object with a likelihood falling below a predetermined threshold (e.g., a probability of 0.8) may be further considered in the context of the generic location shown in the image in which the object appears.

Figure 8:
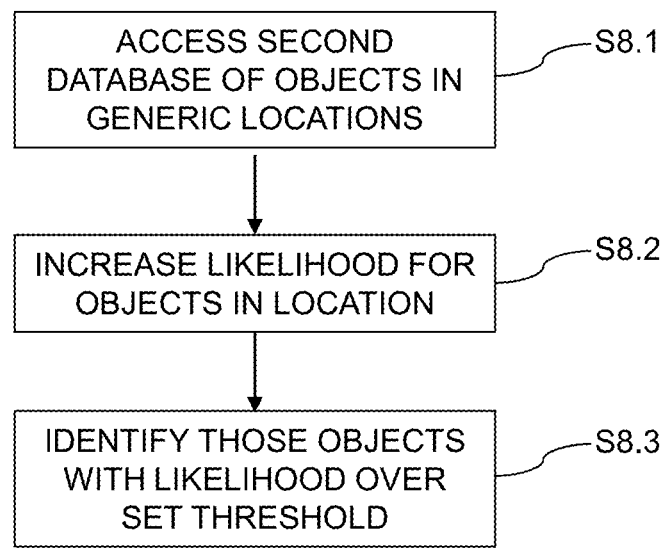
FIG. 8 is a flowchart depicting various steps of a method for identifying further objects in an image, in accordance with an embodiment of the present invention.

FIG. 8 shows a flowchart that details a preferred method for carrying out the step S6.6 of FIG. 6, which is the step of identifying unidentified, detected objects, on the basis of a determined generic location for the image, in accordance with an embodiment of the invention. The method comprises step S8.1, which comprises accessing the second database 34, defining a set of known objects for each of a list of generic locations; and secondly step S8.2, which comprises increasing an assigned likelihood for an unidentified detected object if the detected object is present in the set of known objects for the determined generic location for the image; and finally step S8.3, which comprises identifying the detected object if the increased assigned likelihood is greater than a predetermined threshold.

In this way, an original assigned likelihood for an object in the image that could not be identified with sufficient certainty may have its likelihood increased if that object is located in the second database 34 for the specific generic location that has been determined in step S6.5 of FIG. 6. For example, in FIG. 2, the image 12 may include an object 24e that is a filing cabinet, but the object 24e may not be identified with sufficient certainty in an initial pass of an identification algorithm over the object 24e. However, once the generic location "office" is determined for the image 12, the second database 34 may include "filing cabinet" as an object that is likely to be found in this generic location.

The likelihood assigned to an object in the initial pass of the identification may be increased by the probability listed for that object in the second database 34, based on the determined generic location. If this increase is sufficient to push the confidence level for an object above the threshold required for sufficient certainty (with or without the use of normalization) then the object may be considered as identified. In the example above of the filing cabinet, the fact that a filing cabinet is more likely to be found in an office (the determined generic location for the image 12) may lead to the confidence level being increased for the object 24e above the predefined threshold, and an identification of object 24e may therefore be achieved.

Figure 9:
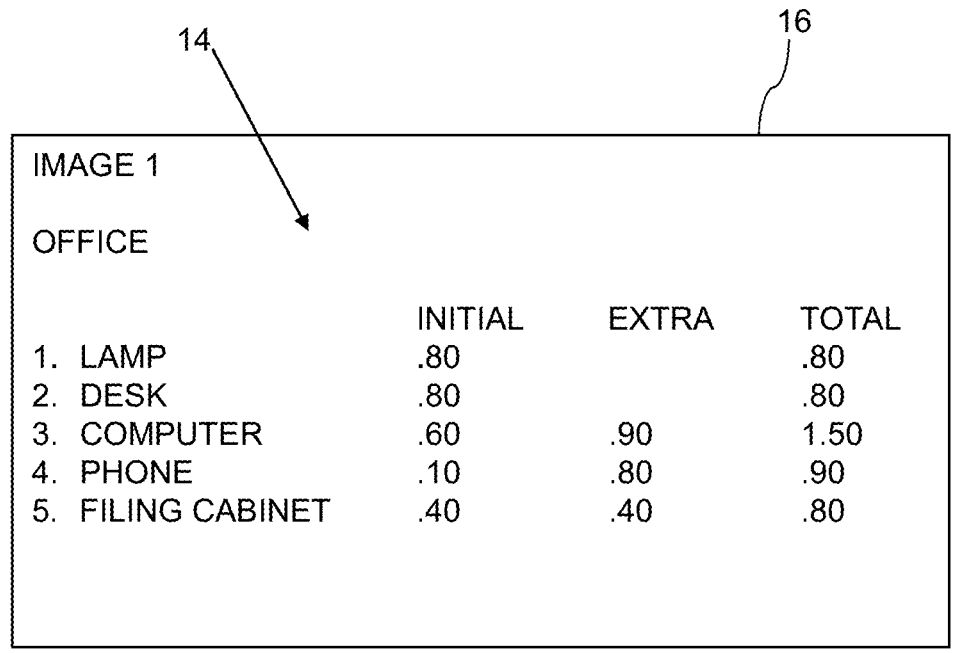
FIG. 9 is a schematic diagram of a display device showing an output, in accordance with an embodiment of the present invention.

FIG. 9 shows a display device 16 providing an output specifying a determined generic location for the image 12, the identified objects lamp 24a' and desk 24b', and further objects 24c, 24d, and 24e (computer, phone, filing cabinet) identified in the image 12, with an assigned likelihood for each of the identified objects 24a' and 24b', and further identified objects 24c, 24d and 24e in the image 12, the assigned likelihood defining a probability that the respective identified object is present in the image 12. From the probabilities shown in the output 14 it may be seen that all of the objects in the image 12 have now been identified with a sufficient level of certainty, since the threshold of 0.8 has been reached.

From FIG. 9, it can be seen that the computer has a total probability of 0.6+0.9=1.5. In general, any probability that is over 1 will be normalized back to 1. In this embodiment, the two probabilities for the objects are summed to arrive at a total probability, but a more complex formula may be applied to the two values to arrive at a final probability. For example, a weighting may be applied to each of the numbers, to avoid one part of the overall process dominating the end result. In the example of FIG. 9, the overall probability is expressed as A+B (where A is the confidence probability from the step S6.3 algorithm and B is the confidence probability from the step S6.5 algorithm), but this formula could be generalized to xA+yB, where x and y are numbers between 0 and 1 that weight the contributions from different algorithms.

More complex numerical handling of the incrementing of the confidence levels for an object may be used, particularly when considering objects at the level of features. An initial examination of an image to detect objects with in the image may use the pseudo-equation:

$$InitialObjectConfidence = SeenFeatures/MaxFeatures$$

In image recognition, objects include features. When performing the initial recognition, the processor 18 may determine how many features an object has (MaxFeatures) and compare that with the number of features found (SeenFeatures). If all of an object's features are found in the image (where SeenFeatures=MaxFeatures) then it is possible to say that there is an InitialObjectConfidence of 1, i.e., the processor 18 may be fairly certain that an object is in the image. Even if SeenFeatures is less than MaxFeatures it may still be possible to say, to a relative degree of certainty, that an object may exist in a scene. For example, the processor may have identified 3 of 4 features of a lamp in the image 12, and therefore it may be possible to assign a 0.75 confidence to the presence of a lamp in the image 12. The salient objects in the image may then be used to query the first database 28, and this may be represented as follows:

$$SalientConfidence = SUM\ (InitialObjectConfidence * SaliencyLookupDB1\ (SalientObject))Location = MAX(SalientConfidence)$$

The processor 18 may take the list of salient identified objects in an image and use the first database 28 to determine possible scenes associated with the image (as shown in FIG. 4). Each object's confidence level may be used to determine a most likely generic location. For example, in image 12 the presence of a lamp may imply a living room or a bedroom at a level of 0.8 and an office at 0.2. The presence of a desk may imply an office at a level of 0.8 or a living room at 0.1. Simply summing the individual location likelihood would result in the processor 18 determining that the image 12 is an office (0.8+0.2>0.8+0.1). However, by taking into account the InitialObjectConfidence, it may result in a determination that the image 12 is a living room, if the processor 18 is more certain of the lamp being present in the image than the desk. For example, if the processor 18 were 0.95 confident in the presence of a lamp and 0.8 confident in the presence of a desk, then a (0.8*0.8)+(0.2*0.95)=0.83 confidence for the office location and a (0.8*0.95)+(0.1*0.8) =0.84 confidence for the living room location would result, indicating that the image is likely a living room. This information may now be used to adjust the object confidence for other objects in the image. This may be expressed as:

$$ExtraObjectConfidence = SaliencyLookup(Location)$$

Given a known generic location, certain objects may be expected to be seen in that location. If there is a match with non-salient objects already identified, this may be included, for example, as ExtraObjectConfidence, shown in the "EXTRA" column in FIG. 9. This may be expressed as:

$$TotalObjectConfidence = InitialObjectConfidence + k*ExtraObjectConfidence$$

The processor 18 uses the ExtraObjectConfidence obtained through the knowledge of the generic location in the image to increase the InitialObjectConfidence. The factor k shown in the final pseudo-equation is a factor that may determine the extent to which the generic location information may be used in the process and will depend on the implementation being used. The value of k may be set to 1, implying that the generic location information may be used in full, or a value less than 1 may be used if the additional information is to be under-weighted.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium in the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying objects in an image, the method comprising:
   receiving, by a computer, an image;

identifying, by the computer, one or more first objects in the image based on information in a first database of objects, wherein one or more second objects in the image are unidentified based on the information in the first database of objects;

identifying, by the computer, one or more salient objects in the image based on execution of a saliency algorithm;

determining, by the computer, a generic location for the image, based on the one or more identified salient objects and information in a second database that associates objects with generic locations; and identifying, by the computer, the one or more second objects, based on the determined generic location for the image, wherein identifying the one or more second objects comprises:

accessing, by the computer, a third database that defines a set of known objects for each of a list of generic locations;

increasing, by the computer, an assigned likelihood for a second object of the one or more second objects if the second object is in the set of known objects for the determined generic location for the image; and identifying, by the computer, the second object if the increased assigned likelihood is greater than a threshold.

2. A method in accordance with claim 1, wherein identifying an object of the one or more first objects in the image comprises:

identifying, by the computer, features of the object;

identifying the object if a number of identified features of the object is above a predetermined threshold value; and assigning a likelihood to a semantic label for the object based on the identified features.

3. A method in accordance with claim 1, wherein the saliency algorithm is selected from the group consisting of image segmentation and saliency maps.

4. A method in accordance with claim 1, wherein determining a generic location for the image based on the identified salient objects comprises:

accessing, by the computer, the second database that associates objects with generic locations, wherein the generic locations in the second database includes generic location likelihoods for the identified salient objects;

summing, by the computer, the generic location likelihoods for the identified salient objects; and selecting, by the computer, the general location with a highest total of summed generic location likelihoods for the identified salient objects.

5. A method in accordance with claim 1, further comprising:

providing, by the computer, an output specifying the determined generic location for the image, the identified first objects, the identified second objects, and an assigned likelihood for each of the identified first objects and identified second objects, the assigned likelihood defining a probability that the respective identified first object or identified second object is present in the image.

6. A computer system for identifying objects in an image, the computer system comprising:

one or more processors;

one or more computer readable storage media; and program instructions stored on at least one of the one or more computer readable storage media, which when executed cause at least one of the one or more processors to perform a method comprising:

receiving, by a computer, an image;

identifying, by the computer, one or more first objects in the image based on information in a first database of objects, wherein one or more second objects in the image are unidentified based on the information in the first database of objects;

identifying, by the computer, one or more salient objects in the image based on execution of a saliency algorithm;

determining, by the computer, a generic location for the image, based on the one or more identified salient objects and information in a second database that associates objects with generic locations; and identifying, by the computer, the one or more second objects, based on the determined generic location for the image, wherein identifying the one or more second objects comprises:

accessing, by the computer, a third database that defines a set of known objects for each of a list of generic locations;

increasing, by the computer, an assigned likelihood for a second object of the one or more second objects if the second object is in the set of known objects for the determined generic location for the image; and identifying, by the computer, the second object if the increased assigned likelihood is greater than a threshold.

7. A computer system in accordance with claim 6, wherein identifying an object of the one or more first objects in the image comprises:

identifying, by the computer, features of the object;

identifying the object if a number of identified features of the object is above a predetermined threshold value; and assigning a likelihood to a semantic label for the object based on the identified features.

8. A computer system in accordance with claim 6, wherein the saliency algorithm is selected from the group consisting of image segmentation and saliency maps.

9. A computer system in accordance with claim 6, wherein determining a generic location for the image based on the identified salient objects comprises:

accessing, by the computer, the second database that associates objects with generic locations, wherein the generic locations in the second database includes generic location likelihoods for the identified salient objects;

summing, by the computer, the generic location likelihoods for the identified salient objects; and selecting, by the computer, the general location with a highest total of summed generic location likelihoods for the identified salient objects.

10. A computer system in accordance with claim 6, wherein the method further comprises:

providing, by the computer, an output specifying the determined generic location for the image, the identified first objects, the identified second objects, and an assigned likelihood for each of the identified first objects and identified second objects, the assigned likelihood defining a probability that the respective identified first object or identified second object is present in the image.

11. A computer program product for identifying objects in an image, the computer program product comprising:

one or more non-transitory computer readable storage media and program instructions stored on at least one of the one or more non-transitory computer readable storage media, the program instructions, when executed by a computer, cause the computer to perform a method comprising:

receiving, by a computer, an image;

identifying, by the computer, one or more first objects in the image based on information in a first database of objects, wherein one or more second objects in the image are unidentified based on the information in the first database of objects;

identifying, by the computer, one or more salient objects in the image based on execution of a saliency algorithm;

determining, by the computer, a generic location for the image, based on the one or more identified salient objects and information in a second database that associates objects with generic locations; and identifying, by the computer, the one or more second objects, based on the determined generic location for the image, wherein identifying the one or more second objects comprises:

accessing, by the computer, a third database that defines a set of known objects for each of a list of generic locations;

increasing, by the computer, an assigned likelihood for a second object of the one or more second objects if the second object is in the set of known objects for the determined generic location for the image; and identifying, by the computer, the second object if the increased assigned likelihood is greater than a threshold.

12. A computer program product in accordance with claim 11, wherein identifying an object of the one or more first objects in the image comprises:

identifying, by the computer, features of the object;

identifying the object if a number of identified features of the object is above a predetermined threshold value; and assigning a likelihood to a semantic label for the object based on the identified features.

13. A computer program product in accordance with claim 11, wherein the saliency algorithm is selected from the group consisting of image segmentation and saliency maps.

14. A computer program product in accordance with claim 11, wherein determining a generic location for the image based on the identified salient objects comprises:

accessing, by the computer, the second database that associates objects with generic locations, wherein the generic locations in the second database includes generic location likelihoods for the identified salient objects;

summing, by the computer, the generic location likelihoods for the identified salient objects; and selecting, by the computer, the general location with a highest total of summed generic location likelihoods for the identified salient objects.

15. A computer program product in accordance with claim 11, wherein the method further comprises:

providing, by the computer, an output specifying the determined generic location for the image, the identified first objects, the identified second objects, and an assigned likelihood for each of the identified first objects and identified second objects, the assigned likelihood defining a probability that the respective identified first object or identified second object is present in the image.

\* \* \* \* \*